United States Patent [19]
Nichols et al.

[11] Patent Number: 6,074,473
[45] Date of Patent: Jun. 13, 2000

[54] LOW VISCOSITY, HIGH SOLIDS CONTENT SLURRY

[75] Inventors: Carl W. Nichols, Sylacauga; Robert G. Cooner, Cropwell, both of Ala.

[73] Assignee: Luzenac America, Inc., Englewood, Colo.

[21] Appl. No.: 09/057,944

[22] Filed: Apr. 9, 1998

[51] Int. Cl.$^7$ ....................................................... C09C 1/42
[52] U.S. Cl. ........................... 106/469; 106/468; 106/486; 106/487; 106/DIG. 4; 501/146
[58] Field of Search ...................... 106/468, 469, 106/487, 486, DIG. 4; 501/146

[56] References Cited

U.S. PATENT DOCUMENTS

| | | | |
|---|---|---|---|
| 4,118,246 | 10/1978 | Horzepa et al. | 106/288 B |
| 4,144,083 | 3/1979 | Abercrombie, Jr. | 106/288 B |
| 4,186,027 | 1/1980 | Bell et al. | 106/288 B |
| 4,187,192 | 2/1980 | Sheridan | 106/469 |
| 4,248,600 | 2/1981 | Almagro | 23/293 R |
| 4,309,222 | 1/1982 | Hoyt, IV | 106/288 B |
| 4,374,203 | 2/1983 | Thompson et al. | 501/148 |
| 4,430,249 | 2/1984 | Gate | 106/469 |
| 4,650,521 | 3/1987 | Koppelman et al. | 106/309 |
| 4,742,105 | 5/1988 | Kelley | 524/447 |
| 5,030,286 | 7/1991 | Crawford et al. | 106/435 |
| 5,279,664 | 1/1994 | Robinson et al. | 106/460 |
| 5,424,259 | 6/1995 | Yordan et al. | 501/146 |
| 5,543,372 | 8/1996 | Shi et al. | 501/145 |
| 5,607,552 | 3/1997 | Andersson et al. | 162/181.6 |
| 5,650,003 | 7/1997 | Curtis et al. | 106/445 |
| 5,676,746 | 10/1997 | Brown | 106/465 |

*Primary Examiner*—Michael Marcheschi
*Attorney, Agent, or Firm*—Sheridan Ross P.C.

[57] ABSTRACT

The present invention provides a high solids slurry and a method for producing the same. Specifically, the present invention provides a talc slurry having a solids content of at least about 58% and a viscosity of less than about 500 centipoise. The talc slurry of the present invention comprises talc, a salt and a base.

32 Claims, No Drawings

LOW VISCOSITY, HIGH SOLIDS CONTENT SLURRY

FIELD OF THE INVENTION

This invention relates to a high solids slurry comprising a phyllosilicate mineral, a salt and a base. Specifically, this invention relates to a talc slurry which has improved high shear rheology. The talc slurry comprises talc, a salt and a base.

BACKGROUND OF THE INVENTION

Phyllosilicate minerals such as kaolinite, talc, chlorite, pyrophyllites and montmorillonite are minerals which contain basic silicates and are used in a variety of applications such as paper manufacturing, talcum powder, tailor's "chalk", cosmetics, and lubricants.

With regards to talc, a slurry of talc is commonly used in paper manufacturing to control, inter alia, pitch. To manufacture these slurries, talc is added to water until a suspension having a desired solids content is produced. This process is conventionally referred to as a "makedown" process. Currently available makedown processes yields a talc slurry having about 25–45% solids with a reasonable viscosity.

A large quantity of talc is often used in the paper and other industries; therefore, reduction of the transportation cost of such material to the customer is the subject of considerable effort. High solids slurries of talc are desirable because it increases the transportation cost effectiveness. However, settling occurs when talc slurries are permitted to stand without agitation. In addition, high solids content talc slurries produced by the current methods are too viscous and form a thick mass or gel after several days, which requires the customer to employ extensive mechanical devices to redisperse the slurries or use various chemicals to render the slurries usable. Often, the slurries are returned to the manufacturer as unacceptable.

U.S. Pat. No. 5,424,259, issued to Yordan et al., discloses a method of making a kaolin clay slurry having at least 50% by weight of kaolin clay by mixing water and a lithium based dispersant and then mixing structured kaolin clay particles with the aqueous composition to form the desired high solids slurry.

U.S. Pat. No. 4,118,246, issued to Horzepa et al., discloses a process for producing kaolin clay slurry having 60% to 70% by weight of kaolin clay using a dispersant and a micromixer. This process requires a use of the special micromixer apparatus.

U.S. Pat. No. 4,144,083, issued to Abercrombie, Jr., provides a method for maintaining the low shear viscosity of a kaolin clay slurry having 60% to 72% by weight of kaolin clay using 0.5 to 3.0 pounds of citric acid or sodium citrate per ton of kaolin clay.

U.S. Pat. No. 4,186,027, issued to Bell et al., discloses a process for making kaolin slurry at pH from 7.5 to 10.5, having a solids content in the range of from 60% to 75% by weight using a dispersing agent and a water-soluble organic polymer. The slurry is subjected to a particle size separation to reduce the percentage of the particles larger than 10 $\mu$m in the slurry to not more than 3% by weight.

U.S. Pat. No. 4,309,222, issued to Hoyt, IV, provides a method for making a kaolin slurry of reduced low shear viscosity in water at a pH of 6 to 8 having a solids content from about 60% to 72% using citrate and polyacrylate.

U.S. Pat. No. 4,650,521, issued to Koppelman et al., provides a process for making a kaolin slurry having a solids content of at least about 65% using a carbonate, a water-soluble organic polyacrylate and a water-soluble anionic phosphate. The slurry is then subjected to a "degritting" process to reduce the percentage of the particles larger than 45 $\mu$m in the slurry to not more than 0.2% by weight.

U.S. Pat. No. 4,374,203, issued to Thompson et al., provides a method for making a clay slurry having at least 50% by weight of the clay using anionic and cationic polymers.

However, for various reasons such as a need for the use of organic polymers, special mixers and/or a need for particle size separation, the prior art fails to provide an acceptable process for producing low cost high solids phyllosilicate mineral slurries having desired rheological properties. Therefore, there is a need for an inexpensive method of preparing a phyllosilicate slurry having a high solids content and low viscosity.

SUMMARY OF THE INVENTION

The present invention is directed to a phyllosilicate mineral slurry comprising a phyllosilicate mineral, salt and a caustic.

The phyllosilicate mineral is preferably selected from the group consisting of kaolinites, talcs, chlorites, pyrophyllites, montmorillonites, smectites and vermiculites. Preferably the phyllosilicate mineral is talc.

The salt is preferably selected from the group consisting of sodium hexametaphosphate, sodium nitrate, lithium chloride, sodium chloride, potassium nitrate, and potassium chloride. Preferably the salt is sodium nitrate. The phyllosilicate mineral slurry of the present invention preferably contains about 15 ppm to about 400 ppm of the salt.

The caustic preferably comprises a base selected from the group consisting of sodium hydroxide, sodium carbonate, lithium hydroxide, lithium carbonate, calcium hydroxide, and magnesium hydroxide. Preferably, the caustic comprises sodium hydroxide. The phyllosilicate mineral slurry contains sufficient amount of caustic to render its pH from about pH 10.2 to about pH 11.5, preferably about pH 10.5.

The phyllosilicate slurry contains at least about 58% by weight of the phyllosilicate mineral while having a viscosity of less than about 500 centipose.

Another embodiment of the present invention provides a method of producing the above mentioned low viscosity, high solids phyllosilicate mineral slurry.

DETAILED DESCRIPTION OF THE INVENTION

The present invention provides a low viscosity aqueous phyllosilicate slurry and a novel method for producing the same. In a preferred embodiment of the present invention, a low viscosity aqueous slurry is produced by adding a phyllosilicate to an aqueous mixture containing a salt while maintaining the pH of the aqueous mixture at about 10.5. As used in this invention, the term "phyllosilicate mineral" (phyllosilicate) refers to those minerals that contain basic silicates. Preferably the phyllosilicate is selected from the group consisting of kaolinites, talcs, chlorites, pyrophyllites, montmorillonites, smectites and vermiculites. More preferably, the phyllosilicate is selected from the group consisting of talcs and pyrophyllites, and most preferably the phyllosilicate is talc. Terms "improved Theological properties" and "a low viscosity" means that the flow characteristics of the slurry of the present invention are improved over the flow characteristics of a conventional talc slurry when the two slurries are compared at equivalent solids content and that the slurry of the present invention can be worked and/or pumped by means which are conventional in the talc industry, depending on the desired use of the slurry. The term "high solids" refers to those slurries in which the content of phyllosilicate mineral is at least about 50% by weight, preferably at least about 58% by weight and more preferably at least about 62% by weight. As used in this invention, parts per million (ppm) values are reported on by weight of dry solids basis, i.e., not including water or any other solvent, unless noted otherwise.

With the process of the present invention, a low viscosity phyllosilicate slurry having from about 50% to about 70% by weight of phyllosilicate can be obtained, more preferably from about 58% to about 70%, and most preferably at least about 58%.

The makedown process involves forming an aqueous composition by mixing water and a salt. As used in this invention, a "salt" refers to a compound which at least about 90% of the amount used in the makedown process dissociates in water at ambient temperature, more preferably at least about 95%, and most preferably about 100%. Preferably, the salt is selected from a compound comprising a cation selected from the group consisting of sodium, lithium, potassium, ammonium, magnesium and calcium, more preferably sodium and lithium, and most preferably sodium. Preferably, the salt is a compound comprising an anion selected from the group consisting of chloride, bromide, iodide, phosphate, sulfate, nitrate, citrate, fluoride, ferrocyanide, thiocyanide, permanganate, tartrate, borates, and tannates, more preferably nitrate, phosphate, and chloride, and most preferably nitrate and chloride. Exemplary salts useful in the present invention include sodium chloride, lithium chloride, lithium nitrate, potassium chloride, potassium nitrate, sodium hexametaphosphate (SHMP), and sodium nitrate.

The makedown process of the present invention can include adding a feedstream of phyllosilicate to the aqueous composition at a rate and under conditions sufficient to obtain a substantially homogeneous high solids slurry. Preferably, the mass median $d_{50}$ of the phyllosilicate is less than about 7 micron ($\mu$m), more preferably from about 1.2 $\mu$m to about 3.5 $\mu$m. A "mass median $d_{50}$" refers to a particle size distribution wherein about 50% of total weight of phyllosilicate is due to particles having less than the mass median $d_{50}$ particle size. Alternatively, it is preferred that the particle size of about 100% of phyllosilicate is less than about 44 $\mu$m.

Alternatively, instead of comminuting the phyllosilicate to a desired particle size prior to the makedown process, a high solids content slurry makedown process of the present invention can be conducted prior to a comminuting process. For example, a high solids content slurry having a relatively large phyllosilicate particle size can be subjected to a wet-milling process to produce a slurry having a desired phyllosilicate particle size. In this manner, the milling process also provides the shearing action required for the makedown process. Moreover, this wet-milling eliminates a need for a separate entrained air removal step, which may be necessary as discussed below.

It has been observed that the ease of preparation of a high solids content low viscosity slurry is dependent on the temperature of the slurry during the makedown process. Preferably, the temperature of the slurry is maintained at from about 32° C. to about 90° C. during the makedown process, more preferably from about 34° C. to about 60° C., and most preferably at least about 46° C. It should be appreciated that the above temperature refers to a temperature during a makedown process only; thus, after the makedown process, the temperature of slurry can be lowered to less than 32° C.

The crystal structure of phyllosilicate minerals is such that there is a net negative electrostatic charge on the faces and a net positive charge on the edges of the crystal. Without being bound by any theory, it is believed that the salt anions, for example, $Cl^{-1}$, $NO_3^{-1}$, $SO_4^{-2}$, and/or $PO_4^{-4}$, in the aqueous composition will adsorb or form an anion cloud layer around the edges of phyllosilicate particles to neutralize the net positive charge in a phenomenon called peptizing. It is believed that the electrolytes (i.e., cations and anions of the salt) stabilize the phyllosilicate particle electrostatics by segregating their cations and anions to satisfy phyllosilicate particle surface electrostatic charges. The low viscosity of the phyllosilicate slurry of the present invention is believed to be due to a predominance of interparticle repulsion created by having phyllosilicate particles surrounded by these electrolytes. However, when the salt level is too high, phyllosilicate particles flocculate due to a reduction of the thickness of the anion cloud layer near the edges of phyllosilicate particles. This reduction of the anion cloud layer increases attraction between particles due to an increase in van der Waals force. Without wishing to be bound by any theory, it is believed that this salt concentration dependency of van der Waals force is responsible for the salt concentration dependency of the peptizing phenomenon. Preferably, the slurry of the present invention contains from about 15 ppm to about 400 ppm of salt, more preferably from about 50 ppm to about 400 ppm, and most preferably from about 50 ppm to about 200 ppm.

The makedown process of the present invention can include adding a caustic to maintain the pH of the slurry to greater than about pH 10.2. Preferably, the pH of the slurry is maintained at from about pH 10.2 to about pH 11.5, and more preferably at about pH 10.5 to about pH 11, and most preferably at about pH 10.5. The caustic preferably comprises a base selected from the group consisting of hydroxides such as sodium hydroxide, lithium hydroxide and potassium hydroxide, carbonates such as sodium or lithium carbonate, calcium hydroxide and magnesium hydroxide. Preferably the base is selected from the group consisting of sodium hydroxide, lithium hydroxide, sodium carbonate, and lithium carbonate, more preferably sodium hydroxide, and lithium hydroxide, and most preferably sodium hydroxide. The caustic can be a solid or a solution comprising a base. Preferably, the caustic is a solution comprising a base. The slurry of the present invention has a caustic content of preferably from about 200 ppm to about 1200 ppm, more preferably from about 550 ppm to about 1000 ppm, and most preferably from about 550 ppm to about 750 ppm. The actual amount of caustic necessary depends, inter alia, on the particle size of phyllosilicate. For example, small particle size phyllosilicates results in higher net surface area, and thus requires higher amount of caustic than large particle size phyllosilicates. Alternatively, as mentioned above, the pH of the slurry is from about pH 10.2 to about pH 11.5, more preferably from about pH 10.5 to about pH 11, and most preferably about pH 10.5. The pH of the slurry can be adjusted after the slurry has formed, continuously throughout the makedown process, during each addition of phyllosilicate, or at anytime during the makedown process. Preferably, the pH of the slurry is maintained at a desired level throughout the makedown process. This can be achieved by continuously monitoring the pH of slurry and adding a caustic as needed. The monitoring and addition of a caustic can be done manually or it can be done automatically, e.g., by a computer controlled process.

It has been found that the presence of calcium and/or magnesium ions cause premature flocculation which requires higher temperature and/or longer makedown time for the preparation of a high solids content slurry. Calcium and magnesium ions can be present in water which is used in the makedown process. Unlike hard water, soft water or deionized (DI) water reduces the amount of caustic required in makedown process and can increase the amount of solid in the slurry. As used in this invention, a "hardness" of water refers to the total amount of calcium and magnesium ions present in water. Preferably, water used in making the slurry of the present invention has a hardness of less than about 50 ppm, more preferably less than about 25 ppm, and most preferably less than about 10 ppm.

The makedown process can be facilitated by high shear agitation of the aqueous composition as the feedstream of phyllosilicate is added to a mixing tank. Preferably, the tip speed of the mixer blade in the mixing tank is from about 4000 feet per minute (fpm) to about 9000 fpm. If the feedstream is added too quickly, the slurry rheology becomes too stiff and difficult to stir. In such a case, the slurry can be allowed to stand without mixing and the stirring can be started when the viscosity of slurry decreases due to peptization via diffusion of electrolytes. In order to avoid having to wait for peptization by diffusion, preferably the feedstream is added at a rate of from about 300 grams/minute per liter of aqueous composition (g/min/l) decreasing to about 60 g/min/l until the slurry reaches about 55% solids. As will be appreciated, as the amount of solids increase in the slurry the feedstream must be added at a slower rate to allow complete peptization to occur and to allow entrained air to escape. Thus, when the solids content reaches about 55%, the addition of feedstream is further decreased to about 40 g/min/l until a desired solids content is reached.

The presence of air in the slurry affects the viscosity of the slurry. It is believed that the primary source of air is from the agglomerated phyllosilicate particles. The agglomerated phyllosilicate particles can be 40% air with phyllosilicate particles being held together by van der Waals force. During the makedown process, air is released from the phyllosilicate particle surface in the slurry but is held in the slurry suspension. Preferably the slurry contains less than about 3.5% by volume of entrained air, more preferably less than about 2%, and most preferably less than about 1%.

One can reduce the amount of entrained air in the slurry by allowing the air to escape from the slurry during the makedown process. This provides a slurry with a reduced viscosity. The removal of entrained air can be accomplished by stopping the high shear agitation for a time sufficient to allow the entrained air to escape or by transferring the slurry to a holding tank. When using a single tank system, the slurry is typically allowed to rest for an average time of from about 10 min. to about 40 min. The slurry is then resubjected to mixing to further increase the solids content.

An apparatus having at least a two tank system is preferred in the makedown process. In this apparatus, the first tank (i.e., the mixing tank) provides a high shear agitation and is used for mixing the slurry. The slurry is then transferred to a second tank (i.e., the holding tank) which does not have a high shear agitation. The second tank provides a rest time for the slurry (i.e., no high shear agitation), thus allowing entrained air to escape and to allow equilibration of particle surface with the electrolytes in solution. To facilitate the removal of air and a complete solvation of the surface area of the phyllosilicates, the holding tank is typically agitated for about 10 minutes per hour. In this manner, the viscosity of slurry can be reduced from about 800 to about 1600 centipose (cps) to about 200 to about 350 cps. The holding tank can have a conical bottom having at least about 55° angle to about 60° angle, preferably at least about 55°, and more preferably at about 60°. The portion of the slurry which is in the bottom of the holding tank is transferred to the first tank (i.e., mixing tank) to continue its mixing. Typically the holding tank is much larger than the mixing tank to allow the slurry to rest for a sufficient time to allow at least part of the entrained air to escape from the slurry. In some cases, the escaping air causes formation of a foam in the holding tank. The amount of foam in the holding tank can be reduced by spraying the foam with a dilute dispersant. Preferably the dispersant comprises the same salt and/or caustic as that used for the makedown process.

The makedown process can also be accelerated by conducting the first about 40 to about 50% solids makedown in a separate mixing tank at the same time that solids are being boosted to at least about 60% solids in the holding tank in a two tank system.

The slurry of the present invention has a rheology which permits, among other things, ease of transfer and use. Preferably the viscosity of the slurry is less than about 500 cps, more preferably less than about 350 cps, and most preferably less than about 200 cps.

EXAMPLES

Unless otherwise stated, viscosity tests were conducted using a Brookfield® viscometer with RV spindles standard.

Example 1

This example illustrates the effect of sodium chloride salt on the viscosity of a slurry.

About 8 grams of table salt (i.e., sodium chloride) was added to about 4 gallons of Mistron® slurry (42.5% solids) having a viscosity of about 3000 centipoise (cps). The viscosity dropped to about 1450 cps after 15 minutes of mixing. When the slurry was left unmixed for two hours the viscosity had dropped to about 80 cps. When remixed the next day, the slurry had a viscosity of 260 cps.

Example 2

This example illustrates the effect of using sodium hydroxide as a caustic in raising the solids content of a slurry.

A 4 gallon batch of slurry was made at pH of about 10.5 from a mixture of Mistron® slurry, Mistron 100®, about 225 ppm of sodium chloride and sodium hydroxide as the caustic. The slurry viscosity was measured to be 400 cps at 60% solids. This slurry had a 33% improvement in simulated pitch adsorption test (SPAT) value compared to Mistron® slurry of Example 1.

Example 3

This example illustrates the effect of using sodium nitrate salt on the SPAT value of a slurry.

A 4 gallon slurry having about 60% solids was made from Mistron 100®, sodium nitrate as a salt, and sodium hydroxide as a caustic to adjust the pH of the slurry to about 10.5. The SPAT value of the slurry was determined to be 27.7. Typical Mistron® slurry SPAT value is 24.

Example 4

This example illustrated SPAT test under mill conditions.

A slurry containing about 0.5 grams of talc was prepared and transferred to a graduated cylinder. A buret was filled with raw linseed oil and titrated into the talc slurry. No more than 3 mL of linseed oil was initially added to the slurry and no more than 1 mL section of linseed oil was added thereafter during subsequent additions. After adding each section of linseed oil, the graduated cylinder was capped and shook briskly for about 5 seconds, then the graduated cylinder was inverted gently every second for about 25 seconds. After each cycle, the contents of the graduated cylinder was observed for 30 seconds. The endpoint was reached when about 15 mL of clear volume at the bottom of the cylinder was observed. The SPAT value was determined by multiplying the amount of linseed oil used by 2. The reported values are grams of adsorbed linseed oil per gram of talc in suspension.

What is claimed is:

1. A method for producing a low viscosity high solids content phyllosilicate mineral slurry comprising the step of:
   (a) forming an aqueous composition by mixing water and a salt;
   (b) adding a feedstream of a phyllosilicate mineral to said aqueous composition at a rate and under conditions sufficient to produce the slurry with a substantially homogeneous high solids slurry; and
   (c) adding a caustic to said high solids slurry to obtain a pH of greater than about 10.2,
wherein the slurry comprises from about 15 ppm by weight to about 400 ppm by weight of the salt on dry basis.

2. The method of claim 1, wherein said salt is selected from the group consisting of sodium hexametaphosphate, sodium nitrate, sodium chloride, lithium chloride, potassium nitrate, and potassium chloride.

3. The method of claim 2, wherein said salt is sodium nitrate.

4. The method of claim 1, wherein said caustic comprises a base selected from the group consisting of sodium hydroxide, sodium carbonate, lithium hydroxide, lithium carbonate, calcium hydroxide and magnesium hydroxide.

5. The method of claim 4, wherein said caustic comprises sodium hydroxide.

6. The method of claim 1, wherein said phyllosilicate mineral is selected from the group consisting of kaolinites, talcs, chlorites, pyrophyllites, montmorillonites, smectites and vermiculites.

7. The method of claim 6, wherein said phyllosilicate mineral is talc.

8. The method of claim 1, wherein said phyllosilicate is present in an amount of at least about 58% by weight.

9. The method of claim 1, wherein the viscosity of said high solids slurry is less than about 500 centipoise.

10. The method of claim 1, wherein said high solids slurry comprises entrained air in an amount of less than about 3.5% by volume.

11. The method of claim 1, wherein said high solids slurry has a temperature of at least about 32° C. during the production of the low viscosity high solids phyllosilicate mineral slurry.

12. The method of claim 1, wherein said phyllosilicate mineral has a mass median $d_{50}$ of from about 1.2 $\mu$m to about 3.5 $\mu$m.

13. The method of claim 1, wherein said water has a hardness of less than about 50 ppm.

14. A phyllosilicate mineral slurry comprising:
   a phyllosilicate mineral;
   a salt in an amount of from about 15 ppm by weight to about 400 ppm by weight on dry basis; and
   a caustic,
wherein said slurry has a pH of greater than about 10.2.

15. The slurry of claim 14, wherein said phyllosilicate mineral is selected from the group consisting of kaolinites, talcs, chlorites, pyrophyllites, montmorillonites, smectites and vermiculites.

16. The slurry of claim 15, wherein said phyllosilicate mineral is talc.

17. The slurry of claim 14, wherein said phyllosilicate mineral is present in an amount of at least about 58% by weight.

18. The slurry of claim 14, wherein said salt is selected from the group consisting of sodium hexametaphosphate, sodium nitrate, lithium chloride, sodium chloride, potassium nitrate, and potassium chloride.

19. The slurry of claim 18, wherein said salt is sodium nitrate.

20. The slurry of claim 14, wherein said caustic comprises a base selected from the group consisting of sodium hydroxide, sodium carbonate, lithium hydroxide, lithium carbonate, calcium hydroxide, and magnesium hydroxide.

21. The slurry of claim 20, wherein said caustic comprises sodium hydroxide.

22. The slurry of claim 14, wherein the pH of said phyllosilicate mineral slurry is from about pH 10.2 to about pH 11.5.

23. The slurry of claim 22, wherein the pH of the phyllosilicate mineral slurry is about pH 10.5.

24. The slurry of claim 14, wherein said phyllosilicate mineral slurry has a viscosity of less than about 500 centipoise.

25. The slurry of claim 14, wherein said phyllosilicate mineral slurry further comprises entrained air in an amount of less than about 3.5% by volume.

26. A talc slurry comprising at least 58% by weight of talc and having a viscosity of less than about 500 centipoise.

27. The talc slurry of claim 26 further comprising from about 15 ppm by weight to about 400 ppm by weight of sodium nitrate on dry basis.

28. The talc slurry of claim 26, wherein the talc slurry has a pH of from about 10.2 to about 11.5.

29. A method for making a low viscosity high solids talc slurry comprising the steps of:
   (a) forming an aqueous composition by mixing water and sodium nitrate;
   (b) adding a feedstream of talc to said aqueous composition at a rate and under conditions sufficient to obtain a high solids slurry; and
   (c) adding a caustic comprising sodium hydroxide to said high solids slurry to produce the slurry with a pH of from about pH 10.2 to about pH 11.5.

30. The method of claim 29, wherein said sodium nitrate is present in an amount of from about 15 ppm by weight to about 400 ppm by weight on dry basis.

31. The method of claim 29, wherein said talc slurry comprises at least about 58% by weight of said talc.

32. The method of claim 29, wherein the viscosity of said talc slurry is less than about 500 centipoise.

* * * * *